US007703721B2

(12) United States Patent
Bigelow

(10) Patent No.: US 7,703,721 B2
(45) Date of Patent: Apr. 27, 2010

(54) REGOLITH CONTAINER FOR USE WITH A STRUCTURE ON AN EXTRATERRESTRIAL MASS

(75) Inventor: Robert T. Bigelow, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 774 days.

(21) Appl. No.: 11/479,276

(22) Filed: Jul. 3, 2006

(65) Prior Publication Data

US 2008/0000168 A1    Jan. 3, 2008

(51) Int. Cl.
*B64G 1/56* (2006.01)
*E21C 51/00* (2006.01)
(52) U.S. Cl. .................. 244/171.7; 52/741.13
(58) Field of Classification Search .............. 244/158.1, 244/171.7; 47/65.8, 65.9; 52/741.11–741.13; 37/398, 400
See application file for complete search history.

(56) References Cited

U.S. PATENT DOCUMENTS 5,058,330 A * 10/1991 Chow ......................... 52/2.11

OTHER PUBLICATIONS

"Bagging System, Soil Stabilization Mat, and Tent Frame for a Lunar Base." Georgia Institute of Technology. USRA, Proceedings of the 6th Annual Summer Conference: NASA/USRA University Advanced Design Program p. 63-67 (See N91-18121 10-12). Published Nov. 1990.*

* cited by examiner

*Primary Examiner*—Timothy D Collins
*Assistant Examiner*—Michael Kreiner
(74) *Attorney, Agent, or Firm*—Franklin E. Gibbs

(57) ABSTRACT

A regolith container for use with regolith on an extraterrestrial mass is disclosed. The filled container covers a portion of a spacecraft to provide the spacecraft with a measure of protection against space debris and radiation. The container can be compartmentalized to reduce the loss of regolith should from the container if a single compartment is penetrated.

3 Claims, 3 Drawing Sheets

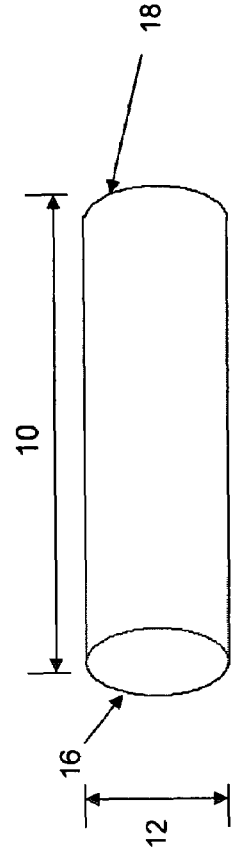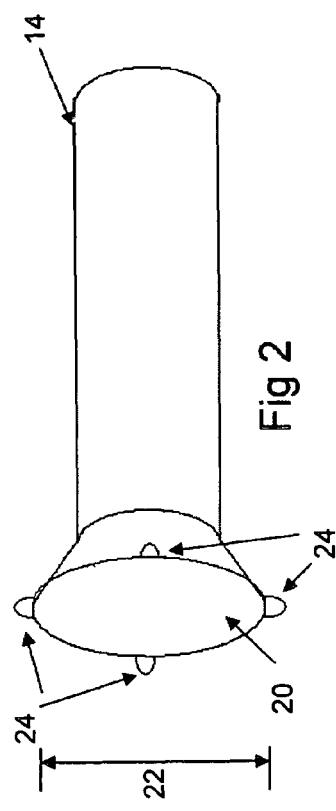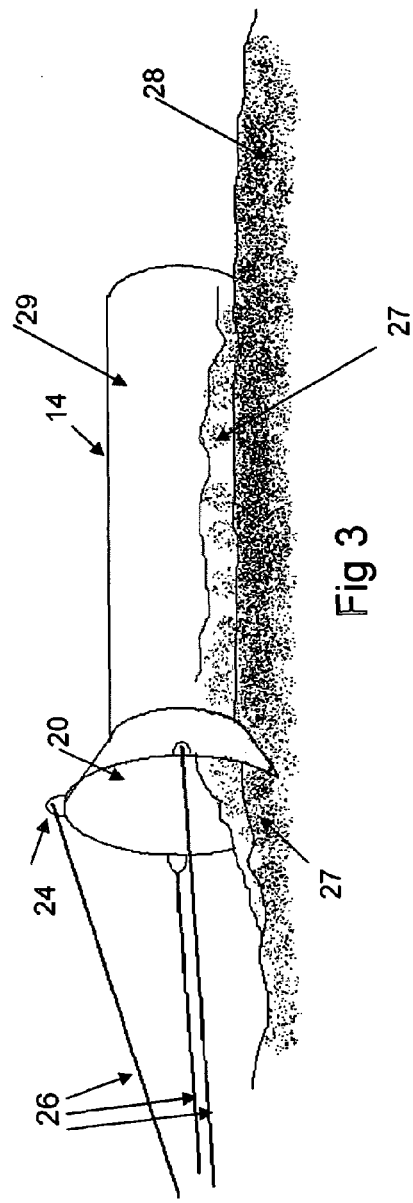

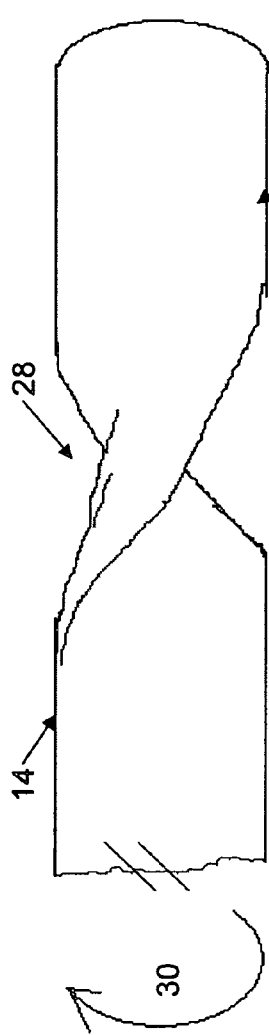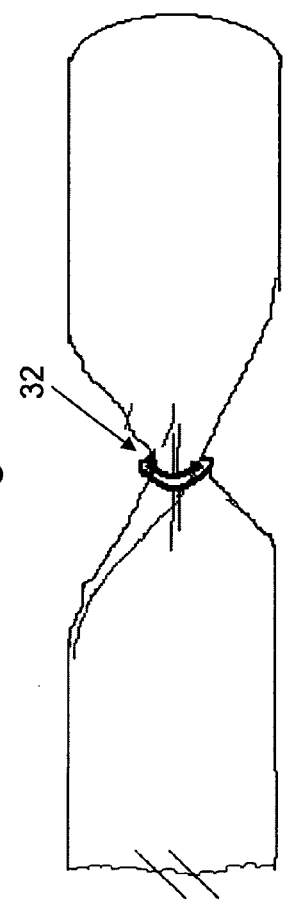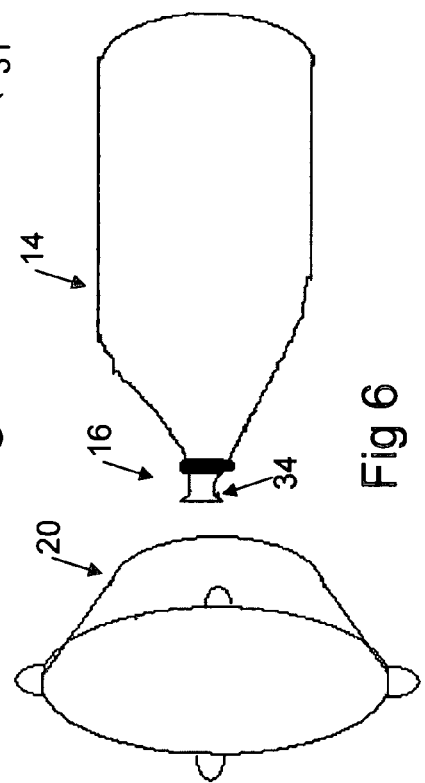

REGOLITH CONTAINER FOR USE WITH A STRUCTURE ON AN EXTRATERRESTRIAL MASS

BACKGROUND OF THE INVENTION

1. Field of the Invention

The present invention relates to a regolith container for use with a structure on an extraterrestrial mass. The filled container provides a measure of protection for the structure against radiation and space debris. The structure can be a solid, semi-solid, or expandable structure.

2. Description of Related Art

Environments on other planets and moons in our solar system are hostile to unaided human habitation. There can be caustic chemical environments and, in some instances, temperatures can vary between more than one hundred degrees centigrade to below one hundred degrees centigrade in relatively short periods of time. Furthermore, many extraterrestrial masses have little or no atmosphere. This lack of atmosphere has serious implications on structures designed to establish a human presence on these other worlds.

Little or no atmosphere means that various forms of solar radiation reach the surface of these worlds without any attenuation. Subatomic particles and electromagnetic radiation across the spectrum bombard the surface of these worlds unimpeded. This radiation can degrade and decompose the materials used to construct human habitat structures.

The lack of any significant atmosphere also permits space debris to strike the surface of these worlds. The size of such debris and the potential lethality can vary greatly. With the aid of the gravity generated by these worlds, and the initial velocity of the debris in space, surface impacts can impart tremendous amounts of energy.

While technology can potentially provide the answer with the use of debris and radiation shielding, this is not the optimum solution. The cost of launching debris shields into orbit and then landing the shields on an extraterrestrial mass can be staggering.

One proposed solution is the use of the naturally occurring regolith of the mass to cover the habitat structure as identified in U.S. Pat. No. 5,058,330 to Chow. The regolith provides a layer of protection to absorb radiation and disperse the energy of debris impacts incident upon the structures.

While the use of regolith appears to be a cost effective solution to the alternative of launching debris shields, the movement of the regolith is an issue that can undermine the use of regolith as an answer to the problem. To move the regolith may require specialized heavy equipment such as bulldozers. The weight of such equipment drives up the launch cost. Furthermore, the use of such equipment can create dust in the atmosphere that may interfere with other operations on the surface of the object.

What is needed is a way to utilize regolith as a shield for extraterrestrial habitats without adversely impacting the launch cost and without interfering with other surface activities.

BRIEF SUMMARY OF THE INVENTION

A regolith container for use with a structure on an extraterrestrial mass is claimed. The regolith container has a body having a first end and a second end, the second end disposed opposite the first end and the second end being closed. The body is hollow and substantially flexible. The first end is adapted to receive regolith from an extraterrestrial mass and the regolith substantially filling the hollow body. The first end is adapted to substantially close when the body is substantially filled with regolith. When the container is filled with the regolith, the container is adapted to cover a portion of a structure disposed on the extraterrestrial mass thereby providing a measure of protection for the structure.

BRIEF DESCRIPTION OF THE DRAWING FIGURES

FIG. 1 is a partial side view of the regolith container;

FIG. 2 is a partial side view of the regolith container including a funnel;

FIG. 3 is a side view of the regolith container being filled with regolith;

FIG. 4 is a perspective view of a twist in the regolith container;

FIG. 5 is a perspective view of a regolith container and a tie;

FIG. 6 is a perspective view of the regolith container tied at one end; and

DETAILED DESCRIPTION

Figure 7:
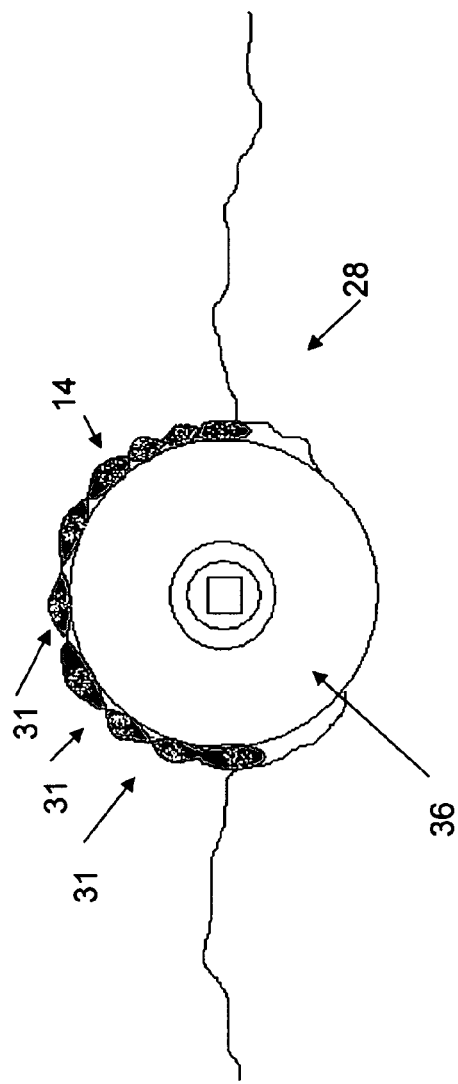
FIG. 7 is an end view of a spacecraft covered by a regolith container.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

Referring now to FIG. 1, a side view of a regolith container 14 is disclosed. The container 14 has a first end 16 that is open and a second end 18 that is substantially closed. The container has a length 10 and a diameter 12. In the preferred embodiment, the length 10 can extend to sixty yards and the diameter of the opening 16 is approximately 14 inches. In the preferred embodiment, the container 14 is substantially cylindrical. However, alternative shapes and geometries are also possible as dictated by the specific requirements of each case. Also, the container 14 can be filled by any number of methods known within the art without modification of the container 14. The container 14 can be constructed from materials that are malleable to a degree and resistant to radiation and penetration by debris. It will be appreciated by those of skill in the art that such materials can be chosed based upon the specific environment of the extraterrestrial mass. Furthermore, the dimensions can be varied to accommodate a variety of situations.

FIG. 2 illustrates a funnel 20 attached to the open end 16 of the regolith container 14. the funnel has a wider mouth 22 than the opening 12 of the container 14. Further, there are attachment points 24 on the funnel 20. the funnel 20 directs regolith into the container 14.

Turning now to FIG. 3, there are cords 26 connected to the attachment points 24 of the funnel 20. the funnel 20 and container 14 are in contact with the regolith 27 of an extraterrestrial mass 28. As illustrated in the cutaway view 29 of the container 14, the regolith 27 fills the container 14. The funnel and container can be drawn over the landscape by various means. For example, on worlds where the gravity is lower than on Earth, a person in an environmental suit could draw the funnel and container. In other situations, surface transportation, such as a lunar rover, could be used that is not exclusive to the task of filling the container. The cords 26 can also be cables, chains, or other such materials.

FIG. 4 illustrates how a segment 31 of the container 14 can be obtained by twising 28 the container 14 in a particular direction of rotation 30. This action compartmentalizes the container. In this way, should an impact penetrate a single segment 31 then the leakage of the regolith would be confined and not extend to the entire container 14.

As shown in FIG. 5, a segment can be created by other methods including the use of ties 32. The tie 32 substantially confines regolith in the segment. Again, this compartmentalizes the container.

In FIG. 6, the container 14 is substantially filled with regolith at which point the funnel 20 is removed and the open end 16 of the container 14 is sealed off. This can be accomplished by any number of ways including, but not limited to, the use of ties, heat sealing, and knotting.

Addressing FIG. 7, the container 14 is placed over a space structure 36 on an extraterrestrial mass 28. In this figure, there are a number of segments 31 identified.

Figure 8:
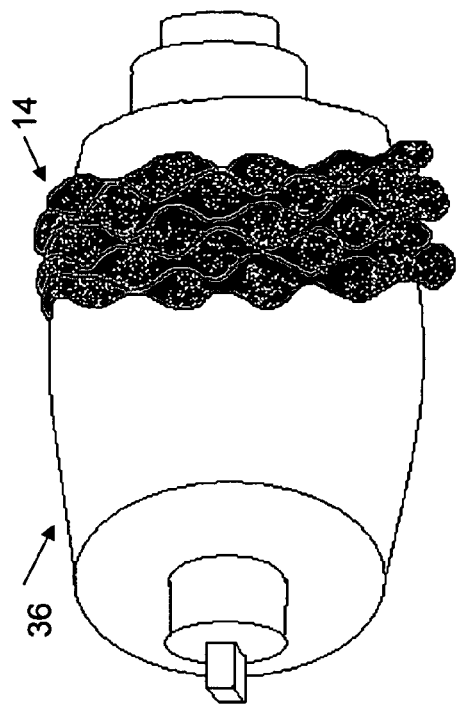
FIG. 8 is a perspective view of a spacecraft partially covered by regolith containers.

FIG. 8 illustrates how a plurality of containers 14 are used to cover a spacecraft 36.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

The invention claimed is:

1. A method for protecting a spacecraft on an extraterrestrial mass utilizing regolith, the method comprising the steps;
   deploying a spacecraft onto an extraterrestrial mass;
   deploying a regolith container on the extraterrestrial mass, the regolith container having a first end and a second end and a funnel connected to the first end and cords connected to the funnel;
   filling the regolith container with regolith by the funnel making contact with the extraterrestrial mass and the funnel directing regolith into the regolith container as the funnel is pulled by the cords;
   removing the funnel;
   sealing the regolith container; and
   covering a portion of the spacecraft with the filled regolith container.

2. The method of claim 1 further comprising the step of repeating the steps until the spacecraft is substantially covered.

3. The method of claim 1 further comprising the step of compartmentalizing the container.

* * * * *